United States Patent
Iwanir et al.

(10) Patent No.: US 10,715,533 B2
(45) Date of Patent: Jul. 14, 2020

(54) REMEDIATION FOR RANSOMWARE ATTACKS ON CLOUD DRIVE FOLDERS

(71) Applicant: Microsoft Technology Licensing, LLC, Redmond, WA (US)

(72) Inventors: Elad Iwanir, Metar (IL); Chen Lahav, Matan (IL); Gal Tamir, Petah Tikva (IL)

(73) Assignee: MICROSOFT TECHNOLOGY LICENSING, LLC., Redmond, CA (US)

(*) Notice: Subject to any disclaimer, the term of this patent is extended or adjusted under 35 U.S.C. 154(b) by 68 days.

(21) Appl. No.: 15/375,001

(22) Filed: Dec. 9, 2016

(65) Prior Publication Data
US 2018/0034835 A1     Feb. 1, 2018

Related U.S. Application Data

(60) Provisional application No. 62/367,060, filed on Jul. 26, 2016.

(51) Int. Cl.
*H04L 29/06*     (2006.01)
*G06F 21/56*     (2013.01)

(52) U.S. Cl.
CPC ........ *H04L 63/1416* (2013.01); *G06F 21/565* (2013.01); *H04L 63/1425* (2013.01); *H04L 63/1491* (2013.01); *G06F 2221/2127* (2013.01)

(58) Field of Classification Search
CPC .......... G06F 21/50; G06F 21/56; G06F 21/60; G06F 21/10; G06F 21/121; G06F 21/565;
(Continued)

(56) References Cited

U.S. PATENT DOCUMENTS 7,664,819 B2 *  2/2010  Murphy ............... G06Q 10/107
                                                        709/206
8,555,385 B1 * 10/2013  Bhatkar ................ G06F 21/556
                                                        726/22
(Continued)

FOREIGN PATENT DOCUMENTS

EP      3038003 A1     6/2016
EP      3107024 A1    12/2016
WO   2018020362 A1     2/2018

OTHER PUBLICATIONS

Mohammad Mehdi Ahmadian et al., Connection-Monitor & Connection-Breaker: A Nove Approach for Prevention and Detection of High Survivable Ransomwares, 2015 IEEE (Year: 2015).*

(Continued)

*Primary Examiner* — Noura Zoubair
*Assistant Examiner* — Mahabub S Ahmed

(57) ABSTRACT

A system for detecting by a cloud service a ransomware attack on a client device is provided. The system monitors changes to files of the client device that are stored by the cloud service. The system assesses whether a change to a file appears to be malicious in that the change may be caused by ransomware. When the change to the file appears to be malicious, the system performs a countermeasure to prevent synchronization of files of the client device with other client devices and with the cloud service to prevent the propagating of files from the client device, which is undergoing a ransomware attack.

22 Claims, 8 Drawing Sheets

(58) Field of Classification Search
CPC ......... G06F 2221/2127; H04L 63/1416; H04L 63/1425; H04L 63/1491
USPC .......................................................... 726/23
See application file for complete search history.

(56) References Cited

U.S. PATENT DOCUMENTS

| | | | |
|---|---|---|---|
| 8,769,684 B2* | 7/2014 | Stolfo | G06F 21/55 709/224 |
| 8,856,542 B2* | 10/2014 | Tatarinov | G06F 21/316 709/224 |
| 8,918,878 B2* | 12/2014 | Niemelä | G06F 21/568 726/22 |
| 9,021,589 B2* | 4/2015 | Anderson | G06F 21/566 709/206 |
| 9,152,789 B2* | 10/2015 | Natarajan | H04L 63/1416 |
| 9,189,629 B1* | 11/2015 | Nachenburg | G06F 21/12 |
| 9,262,296 B1* | 2/2016 | Soeder | G06F 11/3604 |
| 9,317,686 B1* | 4/2016 | Ye | G06F 11/1461 |
| 9,514,309 B1* | 12/2016 | Mann | G06F 21/60 |
| 9,535,932 B1 | 1/2017 | DeSantis et al. | |
| 9,578,044 B1* | 2/2017 | Sharma | H04L 63/1416 |
| 9,602,536 B1* | 3/2017 | Brown, Jr. | H04L 63/1491 |
| 9,679,134 B1* | 6/2017 | Jing | G06F 21/566 |
| 9,838,405 B1* | 12/2017 | Guo | H04L 63/1416 |
| 9,852,289 B1* | 12/2017 | Mann | G06F 21/60 |
| 9,860,208 B1* | 1/2018 | Ettema | G06F 21/602 |
| 9,860,261 B2* | 1/2018 | Halfon | H04L 63/1425 |
| 9,888,032 B2* | 2/2018 | Dekel | H04L 63/145 |
| 9,990,511 B1* | 6/2018 | Dreyfus | G06F 21/6218 |
| 10,007,795 B1* | 6/2018 | Chung | G06F 21/568 |
| 10,009,360 B1* | 6/2018 | Todd | H04L 63/1416 |
| 10,032,033 B2* | 7/2018 | Gu | G06F 11/1458 |
| 10,055,582 B1 | 8/2018 | Weaver et al. | |
| 10,063,654 B2* | 8/2018 | Kirti | H04L 67/306 |
| 10,122,752 B1* | 11/2018 | Soman | H04L 63/1441 |
| 10,262,137 B1* | 4/2019 | Hart | G06F 21/554 |
| 10,375,096 B2* | 8/2019 | Machlica | H04L 63/1425 |
| 2002/0174349 A1* | 11/2002 | Wolff | G06F 21/565 713/188 |
| 2003/0023866 A1* | 1/2003 | Hinchliffe | G06F 21/567 726/24 |
| 2005/0108568 A1* | 5/2005 | Bussiere | H04L 63/1408 726/4 |
| 2006/0031940 A1* | 2/2006 | Rozman | G06F 21/53 726/27 |
| 2008/0086638 A1* | 4/2008 | Mather | G06F 17/30861 713/168 |
| 2008/0141374 A1* | 6/2008 | Sidiroglou | G06F 21/554 726/23 |
| 2008/0148403 A1* | 6/2008 | Manion | G06F 21/56 726/22 |
| 2008/0196104 A1* | 8/2008 | Tuvell | H04L 51/12 726/24 |
| 2008/0263669 A1 | 10/2008 | Alme | |
| 2009/0328216 A1* | 12/2009 | Rafalovich | H04L 43/0876 726/23 |
| 2011/0047620 A1* | 2/2011 | Mahaffey | G06F 21/564 726/23 |
| 2011/0219450 A1* | 9/2011 | McDougal | G06F 21/56 726/23 |
| 2012/0066765 A1* | 3/2012 | O'Brien | G06F 21/554 726/23 |
| 2012/0151046 A1* | 6/2012 | Weiss | G06F 21/604 709/224 |
| 2012/0323829 A1* | 12/2012 | Stokes | G06F 21/563 706/12 |
| 2013/0067576 A1* | 3/2013 | Niemela | G06F 21/568 726/24 |
| 2013/0091570 A1* | 4/2013 | McCorkendale | G06F 21/56 726/23 |
| 2013/0104230 A1* | 4/2013 | Tang | G06F 21/552 726/23 |
| 2013/0160124 A1 | 6/2013 | St hlberg et al. | |
| 2013/0263226 A1* | 10/2013 | Sudia | H04L 63/1466 726/4 |
| 2014/0130164 A1* | 5/2014 | Cafasso | H04L 63/1408 726/23 |
| 2014/0181971 A1 | 6/2014 | Tatarinov et al. | |
| 2014/0298468 A1* | 10/2014 | Yamamura | G06F 21/552 726/23 |
| 2014/0310246 A1 | 10/2014 | Vijayan et al. | |
| 2014/0373153 A1 | 12/2014 | Niemela | |
| 2015/0067853 A1* | 3/2015 | Amrutkar | H04L 63/1466 726/23 |
| 2015/0163121 A1* | 6/2015 | Mahaffey | G06F 11/0709 707/687 |
| 2015/0172304 A1* | 6/2015 | Kleczynski | H04L 63/1416 726/23 |
| 2015/0172311 A1* | 6/2015 | Freedman | H04L 63/1433 726/1 |
| 2015/0235177 A1* | 8/2015 | Shraim | G06Q 10/107 726/26 |
| 2015/0269379 A1* | 9/2015 | Ramzan | G06F 21/55 726/23 |
| 2015/0326600 A1* | 11/2015 | Karabatis | H04L 63/1433 726/25 |
| 2015/0347768 A1* | 12/2015 | Martin | G06F 21/62 726/1 |
| 2015/0381637 A1* | 12/2015 | Raff | H04L 63/1416 726/23 |
| 2016/0012235 A1* | 1/2016 | Lee | G06Q 10/0635 726/25 |
| 2016/0065594 A1* | 3/2016 | Srivastava | H04L 63/1433 726/23 |
| 2016/0077923 A1 | 3/2016 | Zhang et al. | |
| 2016/0092684 A1* | 3/2016 | Langton | G06F 21/577 726/23 |
| 2016/0127388 A1* | 5/2016 | Cabot | G06F 21/564 726/23 |
| 2016/0149931 A1* | 5/2016 | Ramos | H04L 63/1408 726/22 |
| 2016/0156655 A1* | 6/2016 | Lotem | H04L 63/145 726/23 |
| 2016/0162886 A1* | 6/2016 | Howe | G06Q 20/382 705/44 |
| 2016/0164894 A1* | 6/2016 | Zeitlin | H04L 63/1416 726/23 |
| 2016/0188880 A1* | 6/2016 | Smith | G06F 21/567 726/23 |
| 2016/0253498 A1* | 9/2016 | Valencia | G06F 21/554 726/23 |
| 2016/0261621 A1* | 9/2016 | Srivastava | H04L 63/1425 |
| 2016/0300227 A1* | 10/2016 | Subhedar | H04L 63/1408 |
| 2016/0308898 A1* | 10/2016 | Teeple | H04L 63/1433 |
| 2016/0323316 A1* | 11/2016 | Kolton | H04L 63/145 |
| 2016/0337390 A1* | 11/2016 | Sridhara | G06F 3/0484 |
| 2016/0344749 A1* | 11/2016 | McAlear | G06F 21/55 |
| 2016/0378988 A1* | 12/2016 | Bhashkar | G06F 21/566 726/24 |
| 2017/0034189 A1* | 2/2017 | Powell | H04L 63/1416 |
| 2017/0063930 A1* | 3/2017 | Chesla | H04L 63/1433 |
| 2017/0076096 A1 | 3/2017 | Challener et al. | |
| 2017/0091453 A1* | 3/2017 | Cochin | G06F 21/565 |
| 2017/0093886 A1* | 3/2017 | Ovcharik | G06F 21/563 |
| 2017/0134405 A1* | 5/2017 | Ahmadzadeh | H04L 63/1416 |
| 2017/0140156 A1* | 5/2017 | Gu | G06F 11/14 |
| 2017/0149825 A1* | 5/2017 | Gukal | H04L 63/1491 |
| 2017/0161495 A1* | 6/2017 | Viswanath | G06F 21/554 |
| 2017/0163682 A1* | 6/2017 | Yu | H04L 63/1491 |
| 2017/0177627 A1* | 6/2017 | Singh | G06F 16/353 |
| 2017/0177867 A1* | 6/2017 | Crofton | G06F 21/566 |
| 2017/0180394 A1* | 6/2017 | Crofton | H04L 63/145 |
| 2017/0223031 A1* | 8/2017 | Gu | G06F 21/568 |
| 2017/0244672 A1* | 8/2017 | Shulman | H04L 63/0245 |
| 2017/0250998 A1* | 8/2017 | Miliefsky | G06F 16/245 |
| 2017/0257397 A1 | 9/2017 | Graham et al. | |
| 2017/0264619 A1* | 9/2017 | Narayanaswamy | H04L 63/0281 |
| 2017/0270293 A1* | 9/2017 | Gu | G06F 21/54 |

(56) References Cited

U.S. PATENT DOCUMENTS

| | | | |
|---|---|---|---|
| 2017/0279822 A1* | 9/2017 | Lord | G06N 5/04 |
| 2017/0289184 A1* | 10/2017 | C | H04L 63/1425 |
| 2017/0302683 A1* | 10/2017 | Kawauchi | G06F 21/53 |
| 2017/0308711 A1* | 10/2017 | Barak | G06F 21/62 |
| 2017/0310705 A1* | 10/2017 | Gopalakrishna | H04L 63/1491 |
| 2017/0310706 A1* | 10/2017 | Wu | H04L 63/029 |
| 2017/0324755 A1* | 11/2017 | Dekel | H04L 63/145 |
| 2017/0329783 A1* | 11/2017 | Singh | G06F 21/552 |
| 2017/0359370 A1* | 12/2017 | Humphries | H04L 63/1441 |
| 2017/0364576 A1* | 12/2017 | Chesla | H04L 63/1441 |
| 2017/0364681 A1* | 12/2017 | Roguine | G06F 21/554 |
| 2017/0366563 A1* | 12/2017 | Volfman | H04L 63/1491 |
| 2018/0004939 A1* | 1/2018 | Kawakita | G06F 21/56 |
| 2018/0007069 A1* | 1/2018 | Hunt | H04L 63/1416 |
| 2018/0007074 A1* | 1/2018 | Kune | G06F 1/28 |
| 2018/0013681 A1* | 1/2018 | Kohout | H04L 67/02 |
| 2018/0018458 A1* | 1/2018 | Schmugar | G06F 21/566 |
| 2018/0018459 A1* | 1/2018 | Zhang | G06F 21/566 |
| 2018/0020013 A1* | 1/2018 | Yoshikawa | G06F 21/554 |
| 2018/0024893 A1* | 1/2018 | Sella | G06F 11/1458 707/648 |
| 2018/0046800 A1* | 2/2018 | Aoki | G06F 21/56 |
| 2018/0106897 A1* | 4/2018 | Shouldice | G01S 13/56 |
| 2018/0211038 A1* | 7/2018 | Breiman | G06F 21/602 |
| 2018/0211039 A1 | 7/2018 | Tamir et al. | |
| 2018/0225230 A1* | 8/2018 | Litichever | G06F 9/45504 |
| 2018/0293377 A1* | 10/2018 | Tomonaga | G06F 21/552 |

OTHER PUBLICATIONS

Xiaoyan Sun1 et al., Collecting Internet Malware Based on Client-side Honeypot, The 9th International Conference for Young Computer Scientists, 2008 IEEE (Year: 2008).*

Vishal Mehta et al., Threat Prediction Using Honeypot and Machine Learning, 2015 1st International Conference on Futuristic trend in Computational Analysis and Knowledge Management (ABLAZE-2015), 2015 IEEE (Year: 2015).*

Supeno Djanali et al., Aggressive Web Application Honeypot for Exposing Attacker's Identity, 2014 1st International Conference on Information Teclmology, Computer and Electrical Engineering (ICITACEE), 2014 IEEE (Year: 2014).*

Bharti Nagpal et al., CATCH: Comparison and Analysis of Tools Covering Honeypots, 2015 International Conference on Advances in Computer Engineering and Applications (ICACEA) IMS Engineering College, Ghaziabad, India , 2015 IEEE (Year: 2015).*

Abhijit Yewale et al., Malware Detection Based on Opcode Frequency, 2016 International Conference on Advanced Communication Control and Computing Technologies (ICACCCT), (Year: 2016).*

Tianda Yang et al., Automated Detection and Analysis for Android Ransomware, 2015 IEEE 17th International Conference on High Performance Computing and Communications (HPCC), 2015 IEEE (Year: 2015).*

Scaife, et al., "CryptoLock (and Drop It): Stopping Ransomware Attacks on User Data," In Proceedings of IEEE 36th International Conference on Distributed Computing Systems, Jun. 2016, pp. 303-312.

"Analytics for Ransomware," http://www.exabeam.com/wp-content/uploads/2016/06/Exabeam_Ransomware_DS.pdf, Retrieved on: Oct. 19, 2016, 2 pages.

Crump, George, "Recovering from ransomware starts with data protection strategy," http://searchdatabackup.techtarget.com/tip/Recovering-from-ransomware-starts-with-data-protection-strategy, Published on: Jul. 2016, 5 pages.

Koecher, Ingmar, "CryptoLocker Defense for Sysadmins," http://www.eventsentry.com/blog/2013/12/cryptolocker-defense-for-sysadmins.html, Published on: Dec. 5, 2013, 10 pages.

"Exabeam Adds Ransomware Detection Capabilities to its Security Intelligence Platform," http://www.exabeam.com/pr/exabeam-adds-ransomware-detection-capabilities-security-intelligence-platform/, Published on: Jun. 13, 2016, 2 pages.

Langton, Asher, "More on Ransomware,",https://blog.junipersecurity.net/more-on-ransomware/, Published on: May 19, 2016, 8 pages.

Pena, Alexs, "How to Deal with Ransomware," https://blogs.technet.microsoft.com/office365security/how-to-deal-with-ransomware/, Published on: Apr. 6, 2016, 10 pages.

Abade, Igor, "Ransomware and OneDrive," http://www.tshooter.com.br/en/2016/07/18/ransomware-and-onedrive/, Published on: Jul. 18, 2016, 6 pages.

Krebs, Brian, "How to Avoid CryptoLocker Ransomware," https://krebsonsecurity.com/2013/11/how-to-avoid-cryptolocker-ransomware/, Published on: Nov. 1, 2013, 8 pages.

Jalil, et al., "Cloud Storage Apps as Malware Delivery Platforms (MDP): Dissecting Petya Ransomware Distribution via Dropbox," https://www.elastica.net/dissecting-petya-ransomware-distribution, Published on: Mar. 30, 2016, 13 pages.

"My files were corrupted or renamed by ransomware. What can I do?", https://www.dropbox.com/en/help/8408, Retrieved on: Oct. 21, 2016, 4 pages.

Otto, Greg, "Ransomware attacks quadrupled in Q1 2016," http://fedscoop.com/ransomware-attacks-up-300-percent-in-first-quarter-of-2016, Published on: Apr. 29, 2016, 9 pages.

"Kaspersky Lab," http://www.kaspersky.com/about/news/virus/2016/Ransom-Aware, Retrieved on: Oct. 21, 2016, 5 pages.

Hsu, C.W. et al., "A Practical Guide to Support Vector Classification," Technical Report, Dept. of Computer Science and Information Engineering, National Taiwan University, Taipei, 2003.

"International Search Report and Written Opinion Issued in PCT Application No. PCT/US2017/040644", dated Sep. 12, 2017, 9 Pages.

"Protect yourself against encryption-based ransomware", https://www.synology.com/en-global/solution/ransomware, Jun. 20, 2016, 6 Pages.

"The end of Ransomware", https://web.archive.org/web/20170104023228/https://www.sophos.com/en-us/lp/ransomware.aspx, Nov. 30, 2016, 3 Pages.

"Non Final Office Action issued in U.S. Appl. No. 15/491,525", dated Oct. 5, 2018, 28 Pages.

"International Search Report and Written Opinion Issued in PCT Application No. PCT/US17/067450", dated Mar. 8, 2018, 11 Pages.

Scaife, et al., "Cerber Ransomware Now Hunts for Databases", In Proceedings of IEEE 36th International Conference on Distributed Computing Systems, Jun. 27, 2016, pp. 303-312.

"Final Office Action Issued in U.S. Appl. No. 15/491,925", dated May 16, 2019, 21 Pages.

"Non-Final Office Action Issued in U.S. Appl. No. 15/491,525", dated Jul. 29, 2019, 16 Pages.

* cited by examiner

REMEDIATION FOR RANSOMWARE ATTACKS ON CLOUD DRIVE FOLDERS

CROSS-REFERENCE TO RELATED APPLICATION

This application claims the benefit of U.S. Provisional Application No. 62/367,060, filed on Jul. 26, 2016, which is hereby incorporated by reference in its entirety. In cases in which a document incorporated by reference herein is inconsistent with contents of this application, the contents of this application control.

BACKGROUND

Ransomware is malware that denies a victim access to their files and then requests a ransom payment in return for allowing access. For example, ransomware may encrypt the victim's files and then provide the victim with the key for decrypting the files after the ransom payment is received. Ransomware may be installed on a victim's computer via a Trojan horse, which appears to be a legitimate program but actually contains malware. If the ransom is paid, but the ransomware is not removed from the victim's computer, then the ransomware may then again repeat the process of encrypting files and demanding a ransom payment.

One well-known ransomware is Locky, which was released in 2016. The ransomware arrives as an email attachment that contains malicious macros. When the user opens the attachment, the attachment requests the user to enable macros if the content appears to be garbled, which is does because the content is indeed garbled. When the user enables macros, the malware is downloaded and executed. The ransomware encrypts files and renames them with a unique 16-character alphanumeric name and the "locky" extension. The user is then instructed to visit a web site for further instructions. The web demands payment in bitcoins with a value of between $350 and $750. When payment is made, the decryption key is provided to the user, who then can decrypt the files.

Ransomware is an increasing problem that affects millions of computers worldwide. Another well-known ransomware, referred to as CryptoWall, was estimated to have received over $18 million in ransom payments. Moreover, ransomware attackers are estimated to have received over $1 billion in revenue in the first half of 2016.

Given the fast growth of cloud computing, it is not surprising the ransomware has been targeting cloud storage. Often, a user sets up their computer so that the files stored on their computer are synchronized with their other devices via cloud-based storage. Once a file is encrypted by ransomware, all copies of the file that are synchronized with the encrypted file also become encrypted. So if a user has multiple devices (e.g., a work desktop, a home desktop, a laptop, and a smartphone) the copy of the file on each device and the cloud storage all become encrypted.

One cloud storage provider recognizes the problem and notes that a previous version of the file can be restored if the encryption is detected within 30 days. In some instances, the changes made since the prior version may be such that they cannot be regenerated, or the cost of regenerating the changes may be significantly more than the ransom payment. Some cloud storage providers may allow for a user to restore only one file at a time, and thousands of files may have been encrypted, which makes restoration at the least very tedious and possibly impracticable. Moreover, some users may not detect the encryption until it is too late to retrieve the prior version.

SUMMARY

A system for detecting by a cloud service a ransomware attack on a client device is provided. The system monitors changes to files of the client device that are stored by the cloud service. The system assesses whether a change to a file appears to be malicious in that the change may be caused by ransomware. When the change to the file appears to be malicious, the system performs a countermeasure to prevent synchronization of files of the client device with other client devices and with the cloud service to prevent the propagating of files from the client device, which is undergoing a ransomware attack.

DETAILED DESCRIPTION

Figure 1:
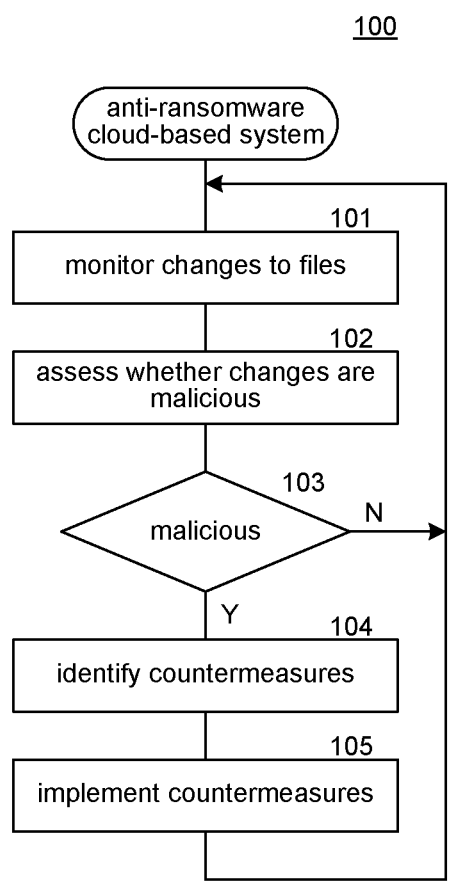
FIG. 1 is a flow diagram that illustrates overall processing of an a ARC system in some embodiments.

An anti-ransomware cloud-service ("ARC") system is provided that automatically detects that ransomware has attacked files and automatically returns the files to a pre-attack state. The ARC system may be provided as a service to an existing cloud provider system or as an agent extender component that executes on a client device. When the ARC system is provided as a service to an existing cloud provider system, the client device may interact with the cloud provider system as before, but it is seamlessly provided with ransomware protection. When the ARC system is provided as an agent extender component, the component provides add-on capability to an existing cloud provider agent that executes on a client device. The ARC system may be employed to detect and process any malicious change to a file, including those not caused by ransomware. For example, a hacker may intentionally or an innocent actor may unintentionally destroy files, disrupt files, or otherwise tamper with a user's files without requesting a ransom. In general, the term "malicious" may be considered to encompass any unauthorized change, irrespective of intent.

In some embodiments, the ARC system monitors changes to user files by using change notifications, constantly scanning the files, or so on. When a change to a file is detected, the ARC system determines whether the file was maliciously changed (e.g., deleted, encrypted, or otherwise corrupted). To determine whether a file has been maliciously changed, the ARC system may use various detection criteria such as (a) entropy changes, (b) heuristics, (c) sudden changes in user behavior (e.g., behavior analysis), and (d) changes in honeypot files or directories on the files stored on the storage of the cloud provider or on the storage of a client device. When it is determined that a file was maliciously changed, the ARC system may notify the user or revert to the previous pre-attack version, which is already saved in the cloud storage.

In some embodiments, an agent extender component executes on a client device as an add-on to a cloud provider agent that is already executing on the client device. Since the agent is running locally and already monitoring for file changes, the agent extender component leverages this functionality and adds a security detection layer that looks for ransomware activity. The agent extender component may ultimately direct that remedial actions be taken. For example, the agent extender component may direct that file synchronization to the cloud be denied. The agent extender component may cause the synchronization to be denied by unlinking the client device from the cloud or revoking permission to synchronize with the cloud. The agent extender component may also interact with the user during the detection phase to reduce false positives. For example, when the agent extender component determines that a file may have been maliciously changed, the agent extender component may not allow the file to be synchronized with the cloud until a user confirms that the change was authorized. The agent extender component may use a "Completely Automated Public Turing test to tell Computer and Humans Apart" ("CAPTCHA") to ensure that it is not the ransomware that is responding to a request for confirmation. Since the agent extender component is an add-on to a cloud provider agent, the agent extender component may be used with the agents of different cloud providers.

In some embodiments, the ARC system may use data analytics to help distinguish between legitimate changes and malicious changes. The ARC system may use various machine-learning techniques, such as a support vector machine, a Bayesian network, learning regression, a neural network, big data analytics, an evolutionary algorithm, and so on to detect malicious changes. The ARC system may collect various features such as the number and frequency of file changes, the location of file changes, the patterns of the changes (file extensions, file headers, entropy changes, file types), user information (e.g., organization or location), and so on. After collecting the features, the ARC system may learn a classifier on a per-user basis, a per-organization basis, or on the basis of some other division of users. For example, the ARC system may use various clustering techniques to generate clusters of users based on various attributes of the users (e.g., business user or personal user and frequency of computer usage).

In some embodiments, the ARC system may employ a support vector machine to train classifiers for each user or each division of users. To train a classifier, the training data includes samples of malicious file changes and samples of legitimate file changes where each sample comprises a feature vector of features and a label indicating whether the sample represents a malicious or legitimate change. A support vector machine operates by finding a hypersurface in the space of possible inputs. The hypersurface attempts to split the positive examples (e.g., ransomware) from the negative samples (e.g., not ransomware) by maximizing the distance between the nearest of the positive and negative samples and the hypersurface. A support vector machine simultaneously minimizes an empirical classification error and maximizes a geometric margin. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Platt, J., "Sequential Minimal Optimization: A Fast Algorithm for Training Support Vector Mechanisms," 1998, http://research.microsoft.com/pubs/69644/tr-98-14.pdf.)

A support vector machine is provided training data represented by $(x_i, y_i)$ where $x_i$ represents a feature vector and $y_i$ represents a label for sample i. A support vector machine may be used to optimize the following:

$$\min_{w,b,t} \frac{1}{2} w^T w + C \sum_{i=1}^{l} \xi_i$$

such that $y_i(w^T \phi(x_i) + b) \geq 1 - \xi_i, \xi_i \geq 0$ where vector w is perpendicular to the separating hypersurface, the offset variable b is used to increase the margin, the slack variable $\varepsilon_i$ represents the degree of misclassification of $x_i$, the function $\varphi$ maps the vector $x_i$ into a higher dimensional space, and C represents a penalty parameter of the error term. A support vector machine supports linear classification but can be adapted to perform nonlinear classification by modifying the kernel function, as represented by the following:

$(K(x_i, x_j) = \varphi(x_i)^T(x_j))$

In some embodiments, the ARC system uses a radial basis function ("RBF") kernel, as represented by the following:

$K(x_i, x_j) = \exp(-y \|x_i - x_j\|^2), y > 0$

The ARC system may also use a polynomial Gaussian RBF or a sigmoid kernel. The ARC system may use cross-validation and grid search to find optimal values for parameters y and C. (See Hsu, C. W., Chang, C. C., and Lin, C. J., "A Practical Guide to Support Vector Classification," Technical Report, Dept. of Computer Science and Information Engineering, National Taiwan University, Taipei, 2003.)

In some embodiment, when the ARC system synchronizes files of a client device, it may download one or more honeypot files to the client device. A honeypot file is a file that is stored on the client device solely for the purpose of detecting a malicious change to the file. The user of the device may be unaware of the presence of any particular honeypot file and would have no reason to change the content of the honeypot file. For example, if the ARC system detects, via the agent extender component, any change to a honeypot file (or even a deletion of a honeypot), the ARC system may assume that the change is caused by ransomware and take remedial actions such as those described above. The ARC system may give a honeypot file a name and content that is similar to those used by a user to help obscure detection by ransomware.

In some embodiments, the ARC system may deploy honeypots for a cloud storage account, continuously monitor for indicators of ransomware, automatically respond by restoring affected files to their pre-attack state, and take actions to prevent future attacks. The ARC system may also provide information to a user to help educate the user about a ransomware attack and how to prevent future attacks. The ARC system may employ an automated bot that interacts with a user based on the type of ransomware attack. The ARC system may maintain a store of information relating to ransomware attacks that is collected from the client devices and/or collected from other repositories of such information (e.g., anti-virus software). When the ARC system detects that a file has been maliciously changed, the ARC system may direct anti-virus software to identify malware that caused the change (e.g., by running a scan of files based on known signatures of ransomware).

In some embodiments, the ARC system monitors changes to files, rather than behavior of an executing process (e.g., ransomware). The ARC system may factor in the entropy (e.g., Shannon entropy) of a file because files affected by ransomware may have a high entropy output (e.g., as a result of encryption). The ARC system may also factor in file variance because a file affected by ransomware may have content that is completely dissimilar from its prior version. For example, the ARC system may employ a similarity-preserving hash function (e.g., Nilsimsa hash, TLSH, and Ssdeep) to detect changes. The ARC system may factor in the number of modifications to a file because files affected by ransomware may be heavily modified. For example, the ARC system may monitor "magic marker" type modifications, extension changes, and/or content deletions.

FIG. 1 is a flow diagram that illustrates overall processing of an ARC system in some embodiments. An ARC system 100 continually monitors file changes and takes countermeasures to suppress the propagation of a maliciously changed file. In block 101, the ARC system monitors changes to files of a cloud storage system or a client device that stores files with the cloud storage system. In block 102, the ARC system assesses whether the changes to one or more files are malicious. The assessment may include applying a classifier to features extracted from files and requesting a user to confirm that a suspected malicious change is malicious. In decision block 103, if the assessment indicates that a change is malicious, then the ARC system continues at block 104, else the ARC system loops to block 101 to continue monitoring changes. In block 104, the component identifies various countermeasures that may include the suppressing of synchronization of files. In block 105, the component implements the countermeasures to counter the propagation of a file that is being held ransom. The component then loops to block 101 to continue monitoring changes. In some embodiments, the monitoring and possibly the assessing may be performed by the client device. In other embodiments, the monitoring, the assessing, and possibly the identifying and the implementing may be performed by a system that is external to the cloud storage system. In other embodiments, the monitoring, the assessing, the identifying, and the implementing may be performed by a system that is internal to the cloud storage system.

Figure 2:
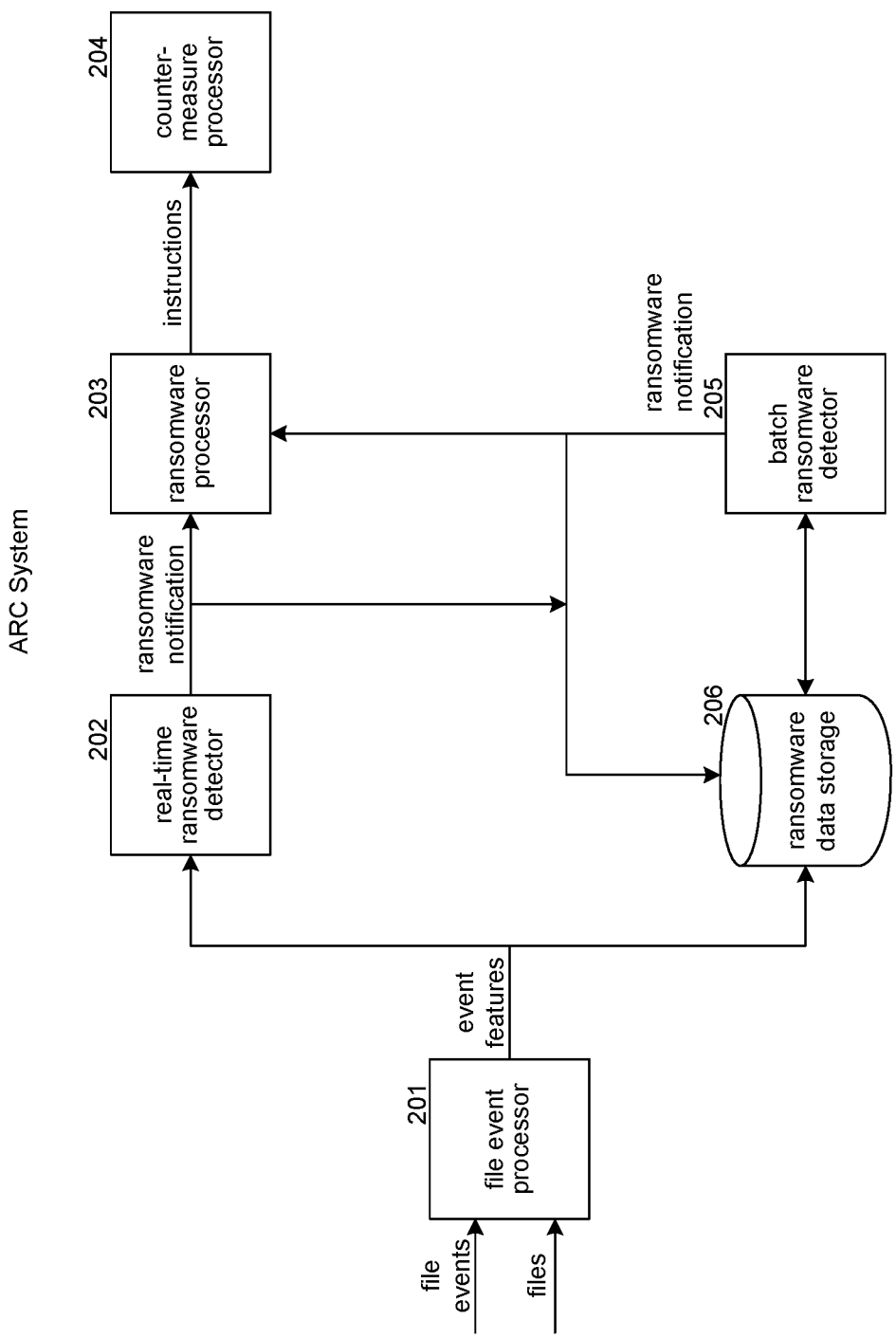
FIG. 2 is a block diagram that illustrates information flow within the ARC system in some embodiments.

FIG. 2 is a block diagram that illustrates information flow within the ARC system in some embodiments. The ARC system may include a file event processor 201, a real-time ransomware detector 202, a ransomware processor 203, a countermeasures processor 204, a batch ransomware detector 205, and a ransomware data storage 206. The file event processor may receive file events and files and extract event features associated with each file event. The file event processor provides the event features to the real-time ransomware detector for processing and to the ransomware data storage for storage. The real-time ransomware detector applies a classifier to the event features to classify a file event as being legitimate or possibly malicious. If a file event is possibly malicious, the real-time ransomware detector provides a ransomware notification to the ransomware processor for processing and to the ransomware data storage for storage. The real-time ransomware detector may process information relating to a change of just a single file or of changes to multiple files that have happened within, for example, the last minute. The ransomware processor receives ransomware notifications and identifies countermeasures for countering the ransomware and provides instructions for implementing the countermeasures to the countermeasure processor. The countermeasure processor receives the instructions and implements the countermeasures indicated by the instructions. The instructions may also be stored in the ransomware data storage as a log of the countermeasures that have been taken. The batch ransomware detector may execute periodically to process file events that have occurred within a detection window. For example, the batch ransomware detector may execute every hour to assess changes (e.g., frequency of changes) that have occurred during a detection window, such as over the past two hours.

Figure 3:
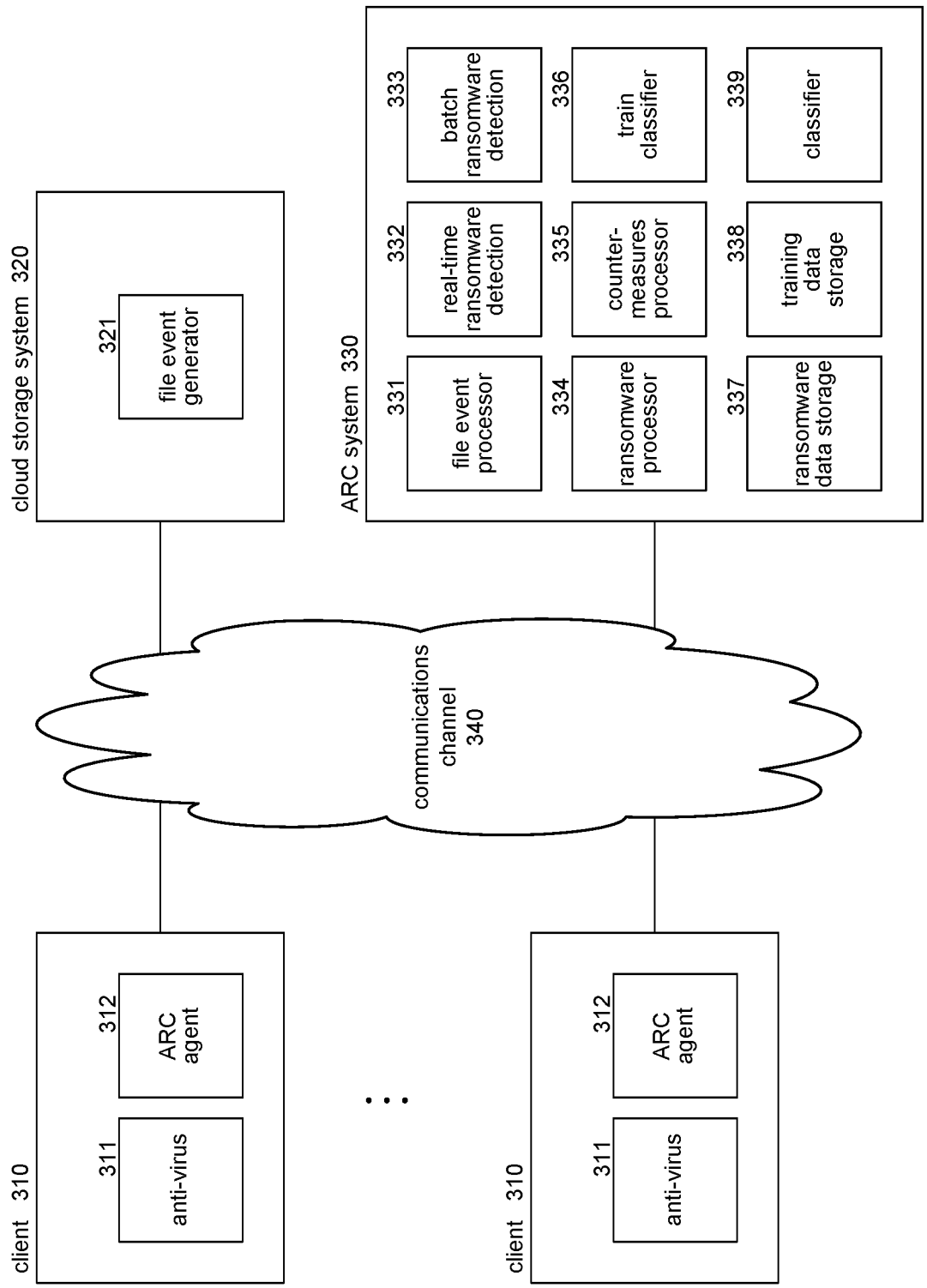
FIG. 3 is a block diagram that illustrates an example arrangement of components of, and components that interface, with the ARC system in some embodiments.

FIG. 3 is a block diagram that illustrates an example arrangement of components of, and components that interface with, the ARC system in some embodiments. Client devices 310, a cloud storage system 320, and an ARC system 330 communicate via a communications channel 340. Each client device may include antivirus software 311, and an ARC agent component 312. The antivirus software may scan incoming communications and activity of the client device to determine whether the client device may be infected with ransomware or other malware. The ARC agent may implement client-side components of the ARC system such as by sending file event notifications to the cloud storage system or the ARC system. A file event generator 321 of the cloud storage system identifies file events resulting from changes to files on the cloud storage system or to files stored on client devices and sends file event notifications to the ARC system. The ARC system includes a file event processor component 331, a real-time ransomware detector component 332, a batch ransomware detector component 333, a ransomware processor component 334, a countermeasures processor component 335, and a ransomware data storage 337, which perform the process as described above with reference to FIG. 2. The ARC system also includes a train classifier component 336, a training data storage 338, and a classifier component 339. The ARC system may also include a storage (not shown) for storing user credentials (e.g., passwords and usernames) of accounts on the cloud storage system so that the ARC system can act on behalf of a user of a client device in directing countermeasures to be taken. The train classifier component inputs training data, which includes sample features and their labels, from the training data storage and trains the real-time classifier and the batch classifier. The classifier techniques may be different or the same for the real-time classifier and the batch classifier. The classifier component is invoked to perform the classifications using parameters generated by the train classifier component.

The computing systems on which the ARC system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the ARC system. The data transmission media are used for transmitting data via transitory, propagating signals or carrier waves (e.g., electromagnetism) via a wired or wireless connection.

The ARC system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the ARC system may be implemented in hardware using, for example, an application-specific integrated circuit (ASIC).

Figure 4:
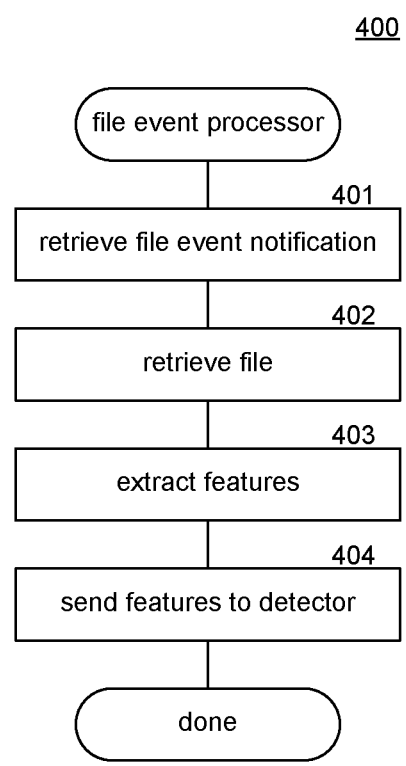
FIG. 4 is a flow diagram that illustrates processing of a file event processor component of the ARC system in some embodiments.

FIG. 4 is a flow diagram that illustrates processing of a file event processor component of the ARC system in some embodiments. A file event processor component 400 is invoked to process file events. In block 401, the component retrieves a file event notification that may be generated by a client device or a cloud storage system. In block 402, the component retrieves one or more files associated with the file event notification. In block 403, the component extracts features from the files. In block 404, the component sends the features to the real-time ransomware detector component and the ransomware data storage. The component then completes.

Figure 5:
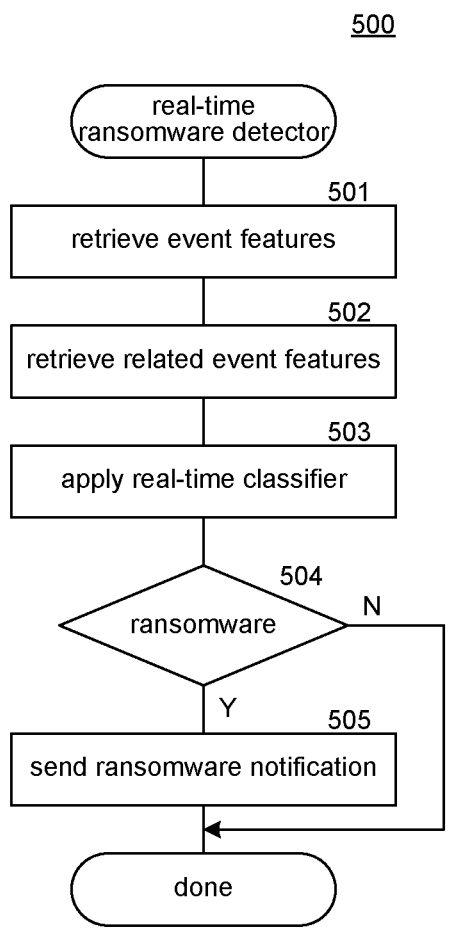
FIG. 5 is a flow diagram that illustrates processing of a real-time ransomware detector component of the ARC system in some embodiments.

FIG. 5 is a flow diagram that illustrates processing of a real-time ransomware detector component of the ARC system in some embodiments. A real-time ransomware detector component 500 is invoked to determine whether a file event may be a result of a malicious change. In block 501, the component retrieves event features for a file event. In block 502, the component may retrieve related event features, for example, for file events that occurred in the last minute. If ransomware is attacking a client device, then the ransomware may make modifications to individual files that the ARC system might not detect as being caused by ransomware, but the frequency of such changes to files may indicate that the changes are being caused by ransomware. In block 503, the component applies a real-time classifier to the event features. In decision block 504, if the real-time classifier indicates that the file event may have been caused by ransomware, then the component continues at block 505, else the component completes. In block 505, the component sends a ransomware notification to a ransomware processor component and then completes.

Figure 6:
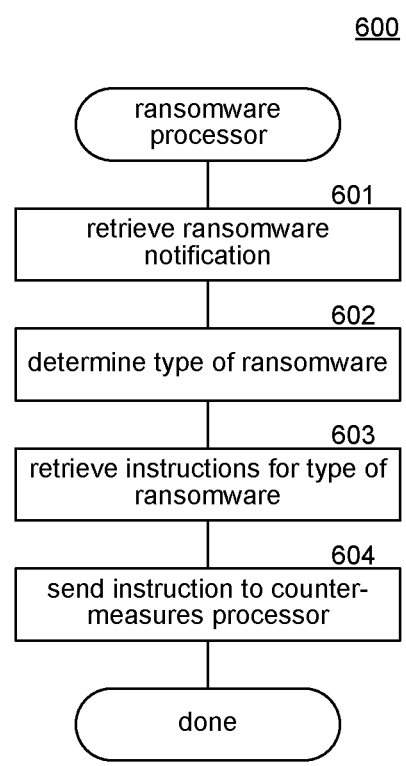
FIG. 6 is a flow diagram that illustrates processing of a ransomware processor component of the ARC system in some embodiments.

FIG. 6 is a flow diagram that illustrates processing of a ransomware processor component of the ARC system in some embodiments. A ransomware processor component 600 is invoked to process a ransomware notification. In block 601, the component retrieves a ransomware notification. In block 602, the component may determine the type of ransomware, such as Locky or CryptoWall. In block 603, the component retrieves countermeasure instructions for the type of ransomware. For example, different types of ransomware may indicate that different types of countermeasures should be taken. Some countermeasures, however, may be common to all types of ransomware, such as suppressing the synchronization of files. In block 604, the component sends the instructions to the countermeasures processor component and then completes.

Figure 7:
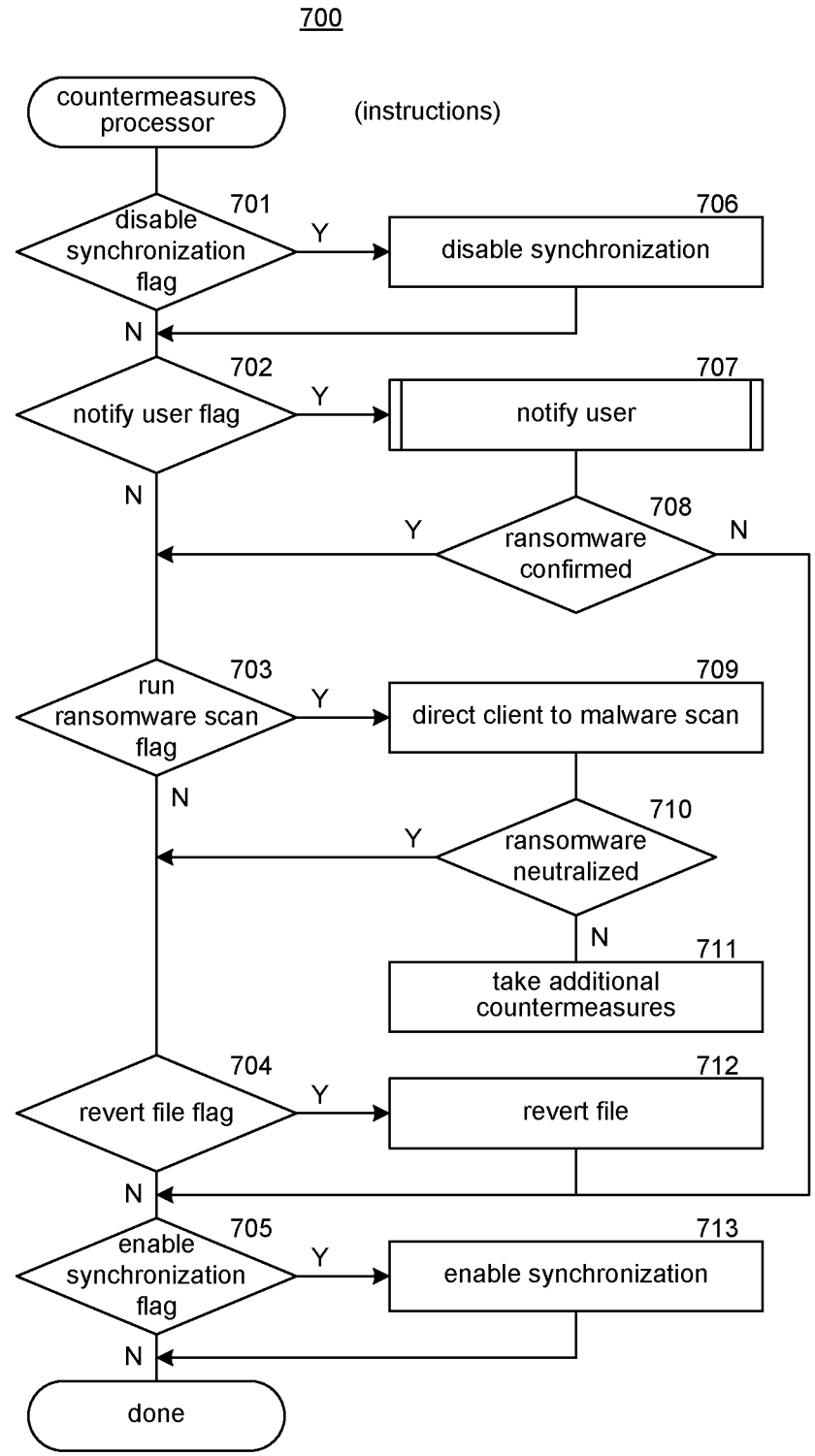
FIG. 7 is a flow diagram that illustrates processing of a countermeasures processor component of the ARC system in some embodiments.

FIG. 7 is a flow diagram that illustrates processing of a countermeasures processor component of the ARC system in some embodiments. A countermeasures processor component 700 is invoked to process instructions for taking countermeasures. The instructions may include instructions such as disabling synchronization, instructing a client device to perform a malware scan, and so on. In decision blocks 701-705, the component determines what instructions have been provided and directs processing to implement those instructions. In decision block 701, if a disable synchronization flag of the instructions is set, then the component continues at block 706, else the component continues at block 702. In block 706, the component disables the synchronization of files between the client device and the cloud storage system and then continues at block 702. The synchronization of other client devices of the same user may also be disabled. In decision block 702, if a notify user flag of the instructions is set, then the component continues at block 707, else the component continues at block 703. In block 707, the component invokes a notify user component to notify the user. In decision block 708, if the user confirms the ransomware (or more generally a malicious change or unauthorized change), then the component continues at block 703, else the component continues at block 705. In decision block 703, if a run ransomware scan flag of the instructions is set, then the component continues at block 709, else the component continues at block 704. In block 709, the component directs the client to run a malware scan, for example, by notifying a client-side component such as the ARC agent that is executing on the client device. In decision block 710, if the malware scan indicates that the ransomware has been neutralized, then the component continues at block 704, else the component continues at block 711. In block 711, the component may direct the taking of additional countermeasures and then completes. In decision block 704, if a revert file flag of the instructions is set, then the component continues at block 712, else the component continues at block 705. In block 712, the component reverts a file to a previous version and then continues at block 705. In block 705, if an enable synchronization flag of the instructions is set, then the component continues at block 713, else the component completes. In block 713, the component enables the synchronization of files and then completes.

Figure 8:
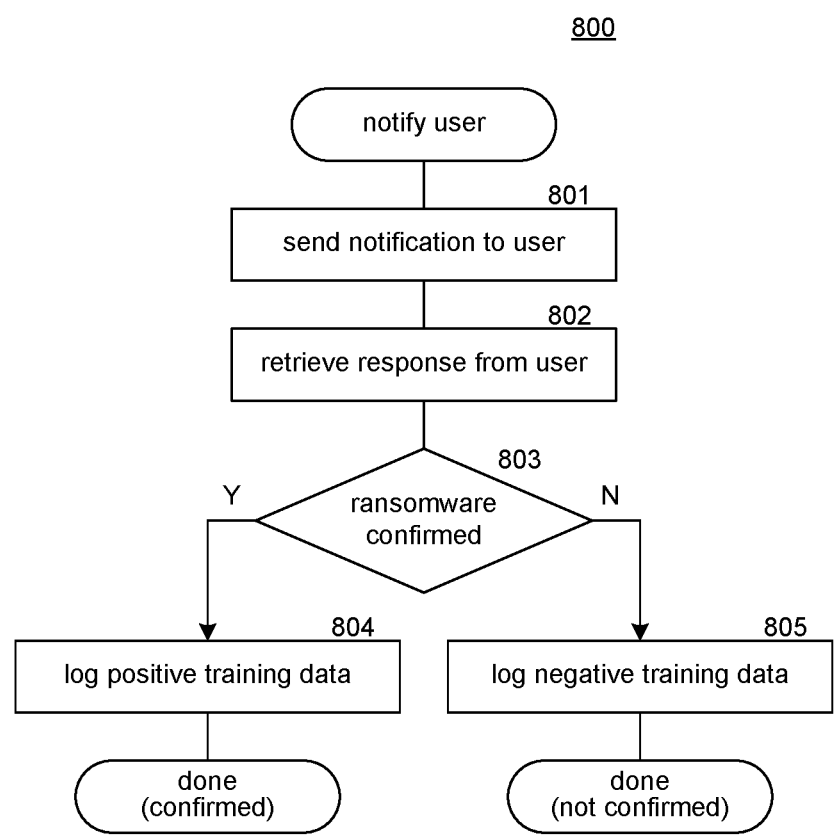
FIG. 8 is a flow diagram that illustrates the processing of a notify user component of the ARC system in some embodiments.

FIG. 8 is a flow diagram that illustrates the processing of a notify user component of the ARC system in some embodiments. A notify user component 800 is invoked to notify a user of suspected ransomware and get confirmation from the user as to whether a change to a file is authorized or unauthorized. In block 801, the component sends a notification to the user that identifies the files and includes additional information such as a characterization of the changes, the time of the changes, and so forth. In block 802, the component receives a response from the user. In decision block 803, if the user has confirmed that the change was unauthorized, then the component continues at block 804, else the component continues at block 805. In block 804, the component logs a ransomware attack as a positive sample of training data and completes, indicating that ransomware or a malicious change has been confirmed. In block 805, the component logs a negative sample of training data and completes, indicating that ransomware or a malicious change has not been confirmed.

The following paragraphs describe various embodiments of aspects of the ARC system. An implementation of the ARC system may employ any combination of the embodiments. The processing described below may be performed by a computing device with a processor that executes computer-executable instructions stored on a computer-readable storage medium that implements the ARC system.

In some embodiments, a method performed by a computing device for detecting by a cloud service a ransomware attack on a client device is provided. The method monitors changes to files of the client device that are stored by the cloud service. The method assesses whether a change to a file appears to be malicious in that the change may be caused by ransomware. When the change to the file appears to be malicious, the method performs a countermeasure to prevent synchronization of files of the client device with other client devices and with the cloud service to prevent the propagating of files from the client device, which is undergoing a ransomware attack. In some embodiments, the method performs a countermeasure of reverting the file whose changes appear to be malicious to a previous version. In some embodiments, the file is a honeypot file. In some embodiments, the assessing is performed by a component executing on the client device. In some embodiments, the assessing is performed by a component of a cloud provider system. In some embodiments, the assessing is performed by a ransomware detection system that interfaces with the cloud service. In some embodiments, the assessing includes applying a classifier that is trained to detect malicious changes. In some embodiments, the method further when the change to the file appears to be malicious, requesting a user to confirm whether the change was malicious. In some embodiments, the method further stores information relating to the change along with a label indicating whether the change was malicious as confirmed by the user for use in training the classifier.

In some embodiments, a ransomware detection system that assists in preventing propagation of maliciously changed files via a cloud storage system is provided. The ransomware detection system comprises one or more computer-readable storage mediums that store computer-executable instructions and the one or more processors executing the computer-executable instructions stored in the computer-readable storage mediums. The instructions control the one or more processors to process file event notifications by, upon receiving a file event notification that identifies a file, retrieving the file and extracting features relating to the file and the file event notification. The instructions control the one or more processors to detect whether the extracted features indicate that a change appears to be malicious by inputting the extracted features to a classifier that indicates whether the change appears to be malicious. The instructions control the one or more processors to, when the change appears to be malicious, process the change to identify countermeasures to be taken, the countermeasures including suppressing synchronization of files with the cloud storage system. In some embodiments, the instructions control the one or more processors to receive confirmations from users as to whether changes that appear to be malicious are known to be malicious, label the extracted features as malicious or not malicious based on the confirmations, and train the classifier using the labeled extracted features as training data. In some embodiments, the instructions control the one or more processors to detect whether the extracted features indicate that the change appears to be malicious employ a real-time classifier and a batch classifier, the real-time classifier for indicating whether a change to a file appears to be malicious as the change is detected and the batch classifier for indicating whether a change to a file appears to be malicious by evaluating changes to one or more files that occurred during a change window of time. In some embodiments, the real-time classifier is provided features derived from only a current version of one file and a most-recent previous version of that one file. In some embodiments, the ransomware detection system is internal to the cloud storage system. In some embodiments, the instructions control the one or more processors to process the identified countermeasures to counter propagation of the changed file. In some embodiments, the ransomware detection system is external to the cloud storage system. In some embodiments, the ransomware detection system interfaces with the cloud storage system, which processes the identified countermeasures to counter propagation of the changed file. In some embodiments, the instructions to process file event notifications and detect whether the extracted features indicate that a change appears to be malicious are performed by a client device that stores files via the cloud storage system.

In some embodiments, one or more computer-readable storage mediums storing computer-executable instructions that, when executed by a computing system, control the computing system to process file event notifications by, upon receiving a file event notification that identifies a file, retrieving the file and extracting features relating to the file and file event notification. The instructions further control the computing system to detect whether the extracted features indicate that a change is determined to be malicious. The instructions further control the computing system to, when the change is determined to be malicious, process the change to identify countermeasures to be taken, the countermeasures including the suppressing of synchronization files with the cloud storage system. The instructions further control the computing system to process the identified countermeasures to counter propagation of the changed file. In some embodiments, the instructions further control the computing system to detect employ a detection criterion selected from a group comprising entropy changes, heuristics, changes in user behavior, and changes in a honeypot. In some embodiments, the instructions further control the computing system to revert the changed file to a prior revision of the changed file. In some embodiments, the reverting is performed automatically after the changed is determined to be malicious. In some embodiments, the reverting is performed after the changed is determined to be malicious and after a user is prompted to approve the reverting.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A system, comprising:
 at least one processor and a memory;
 wherein the at least one processor is configured to:
  obtain a file event notification of a change made to a file of a client device;
  use a support vector machine classifier to determine whether the change was malicious or legitimate, wherein the support vector machine classifier is trained with data of one or more users of the file, the data of the one or more users of the file including a frequency of changes made to the file, a number of changes made to the file, patterns in changes made to the file, and locations of the one or more users of the file;

upon the support vector machine classifier determining that the change was malicious, determine that a first type of a plurality of types of ransomware was used to make the change to the file; and based on the determination that the first type of ransomware made the change, generate one or more instructions to suppress propagation of the file with a cloud service.

2. The system of claim 1, wherein the at least one processor is further configured to:
perform a countermeasure to revert the file to a previous version of the file.

3. The system of claim 1, wherein the file is a honey pot file.

4. The system of claim 1, wherein the determination that the first type of ransomware was used to make the change to the file is performed by a component executing on the client device.

5. The system of claim 1, wherein the determination that the first type of ransomware was used to make the change to the file is performed by a component of the cloud service.

6. The system of claim 1, wherein the determination that the first type of ransomware was used to make the change to the file is performed by a ransomware detection system that interfaces with the cloud service.

7. The system of claim 1, wherein the at least one processor is further configured to:
when the change to the file is determined to be malicious, request a user to confirm whether the change was malicious.

8. The system of claim 1, wherein the at least one processor is further configured to:
store information relating to the change along with a label indicating whether the change was malicious as confirmed by a user for use in training the support vector machine classifier.

9. A device, comprising:
one or more processors and a memory;
wherein the one or more processors perform actions that:
process file event notifications by, upon receiving a file event notification that identifies a change to a file on a first computing device, retrieving the file and extracting features relating to the file and the file event notification;
use a support vector machine classifier to determine whether the file was maliciously changed on the first computing device, wherein the support vector machine classifier is trained with data of one or more users of the file, the data of the one or more users of the file including a frequency of changes made to the file, a number of changes made to the file, patterns in changes made to the file, and locations of the one or more users of the file; and
based on the determination that a first type of a plurality of types of ransomware made the change, generate one or more instructions to suppress propagation of the file with a cloud service.

10. The device of claim 9, wherein the one or more processors perform further actions that:

receive at least one confirmation from at least one user that the change is malicious, label the extracted features as malicious, and train the classifier using the labeled extracted features.

11. The device of claim 9, wherein the support vector machine classifier employs a real-time classifier and a batch classifier, the real-time classifier indicates that a change to the file is malicious as the change is detected, the batch classifier indicates that the change to the file is malicious by evaluation of changes to one or more files that occurred during a change window of time.

12. The device of claim 11, wherein the real-time classifier is provided features derived from only a current version of the file and a most-recent previous version of the file.

13. The device of claim 9, wherein the device is internal to the cloud service.

14. The device of claim 9, wherein the one or more processors perform further actions that:
process countermeasures to counter propagation of the file.

15. The device of claim 9, wherein the device is external to the cloud service.

16. The device of claim 15, wherein the device interfaces with the cloud service that processes identified countermeasures to counter propagation of the changed file.

17. The device of claim 9, wherein actions to process the file event notifications and detect whether the extracted features indicate that a change is malicious are performed by a client device that stores files via the cloud service.

18. A method, comprising:
processing, at a computing device having at least one processor and a memory, file event notifications by, upon receiving a file event notification that identifies a file, retrieving the file and extracting features relating to the file and file event notification, wherein the file is stored in a first computing device;
detecting, through a support vector machine classifier using the extracted features, that a change made to the file is malicious, wherein the support vector machine classifier is trained on data of one or more users of the file, the data of the one or more users of the file including a frequency of changes made to the file, a number of changes made to the file, patterns in changes made to the file, and locations of the one or more users of the file;
determining that at least one type of a plurality of types of ransomware was used to make the change to the file; and
based on the at least one type of ransomware being a first type, generating instructions to suppress propagation of the file with a cloud storage system.

19. The method of claim 18, further comprising:
employing a detection criterion selected from a group comprising entropy changes, heuristics, changes in user behavior, and changes in a honeypot.

20. The method of claim 18, further comprising:
reverting the file to a prior revision of the file.

21. The method of claim 20, wherein the reverting is performed automatically after the change is detected to be malicious.

22. The method of claim 20, wherein the reverting is performed after the change is determined to be malicious and after a user is prompted to approve the reversion.

* * * * *